(12) United States Patent
Itadani et al.

(10) Patent No.: US 8,222,310 B2
(45) Date of Patent: Jul. 17, 2012

(54) EXTRUDED POLYPROPYLENE RESIN FOAM AND PROCESS FOR PRODUCING THE SAME

(75) Inventors: Toru Itadani, Tokyo (JP); Masaaki Ono, Tokyo (JP)

(73) Assignee: Asahi Fiber Glass Company, Limited, Tokyo (JP)

(*) Notice: Subject to any disclaimer, the term of this patent is extended or adjusted under 35 U.S.C. 154(b) by 178 days.

(21) Appl. No.: 12/678,191

(22) PCT Filed: Sep. 12, 2008

(86) PCT No.: PCT/JP2008/066600
§ 371 (c)(1),
(2), (4) Date: May 25, 2010

(87) PCT Pub. No.: WO2009/035111
PCT Pub. Date: Mar. 19, 2009

(65) Prior Publication Data
US 2011/0021650 A1    Jan. 27, 2011

(30) Foreign Application Priority Data

Sep. 14, 2007 (JP) ................................. 2007-239779

(51) Int. Cl.
*C08J 9/00* (2006.01)
*C08J 9/14* (2006.01)
(52) U.S. Cl. ............... 521/79; 264/50; 516/99; 521/143
(58) Field of Classification Search .................... 521/79, 521/143; 264/50; 516/99
See application file for complete search history.

(56) References Cited

U.S. PATENT DOCUMENTS

| | | | |
|---|---|---|---|
| 5,629,076 A | 5/1997 | Fukasawa et al. | |
| 6,077,878 A | 6/2000 | Okura et al. | |
| 6,262,138 B1 | 7/2001 | Miyama et al. | |
| 6,334,970 B1 | 1/2002 | Kuroda et al. | |
| 7,901,764 B2 * | 3/2011 | Takase et al. | 428/314.8 |
| 2008/0176971 A1 | 7/2008 | Sugawara et al. | |
| 2009/0011218 A1 | 1/2009 | Sugawara et al. | |

FOREIGN PATENT DOCUMENTS

| | | |
|---|---|---|
| EP | 0 841 354 A1 | 5/1998 |
| EP | 743337 B1 * | 4/1999 |
| EP | 1 054 033 A1 | 11/2000 |
| EP | 1 813 643 A1 | 8/2007 |
| JP | 4 363227 | 12/1992 |
| JP | 7 252318 | 10/1995 |
| JP | 10 130412 | 5/1998 |
| JP | 2000 43076 | 2/2000 |
| JP | 2007 100016 | 4/2007 |
| WO | WO 9520622 A1 * | 8/1995 |
| WO | WO 01/70861 A2 | 9/2001 |
| WO | WO 01/70861 A3 | 9/2001 |
| WO | 2006 054714 | 5/2006 |
| WO | 2006 101142 | 9/2006 |

OTHER PUBLICATIONS

Extended European Search Report issued Apr. 15, 2011, in Application No. / Patent No. 08830425.8-1253 / 2189494 PCT/JP2008066600.

* cited by examiner

*Primary Examiner* — Timothy J. Kugel
(74) *Attorney, Agent, or Firm* — Oblon, Spivak, McClelland, Maier & Neustadt, L.L.P.

(57) ABSTRACT

An extruded polypropylene type resin foam having a high expansion ratio of at least 15 times and a closed cell ratio of at least 70% and excellent in the heat insulation property, and its production process, are provided.

An extruded polypropylene type resin foam, which is produced by extrusion-foaming a polypropylene type resin composition containing a linear polypropylene type resin having a melt tension at 230° C. of from 5 to 30 g, by using a blowing agent containing at least a hydrocarbon type gas, and which has an expansion ratio of at least 15 times and a closed cell ratio of at least 70%.

20 Claims, 2 Drawing Sheets

EXTRUDED POLYPROPYLENE RESIN FOAM AND PROCESS FOR PRODUCING THE SAME

The present application is a national stage application under 35 U.S.C. §371 of international application PCT/JP08/066600 having a filing date of Sep. 12, 2008 and claiming priority to Japanese patent application 2007-239779 having a filing date of Sep. 14, 2007.

TECHNICAL FIELD

The present invention relates to an extruded polypropylene type resin foam having a high expansion ratio, a high closed cell ratio and an extremely excellent thermal insulation property, and a process for producing such a foam.

BACKGROUND ART

Heretofore, an extruded foam employing a polypropylene resin has been known. For example, although a high expansion ratio is usually difficult to achieve by a polypropylene resin, Patent Document 1 describes an extruded polypropylene type resin foam having a high expansion ratio of at least 10 times, an average cell size of as small as less than 400 μm and a closed cell ratio of at least 40%, which is obtained by employing a polypropylene resin having an excellent viscoelastic property that is obtained by adjusting the molecular weight and the molecular weight distribution. By this process, since it is possible to produce an extruded foam having many cell walls, it is possible to efficiently shield radiation heat from the outside according to the document.
Patent Document 1: WO2006/054714

DISCLOSURE OF THE INVENTION

Problems to be Solved by the Invention

However, although an extruded polypropylene type resin foam obtainable by the above process has an expansion ratio of at least 10 times and a closed cell ratio of at least 40%, it is not easy to further increase the closed cell ratio to be e.g. at least 70%, and the foam obtained by the process has not yet achieved a desired high thermal insulation property.

The present invention has been made considering the above problems, and it is an object of the present invention to provide an extruded polypropylene type resin foam having a high expansion ratio of at least 15 times, a closed cell ratio of at least 70% and an excellent thermal insulation property, and a process for producing such a foam.

Means for Solving the Problems

The present inventors have conducted extensive studies to achieve the above objects, and have discovered that the above objects can be achieved by the invention having the following gists.
(1) An extruded polypropylene type resin foam, which is produced by extrusion-foaming a polypropylene type resin composition containing a linear polypropylene type resin having a melt tension at 230° C. of from 5 to 30 g, by using a blowing agent containing at least a hydrocarbon type gas, and which has an expansion ratio of at least 15 times and a closed cell ratio of at least 70%.
(2) The extruded polypropylene type resin foam according to the above (1), wherein the linear polypropylene type resin has a melt flow rate (MFR) at 230° C. and a melt tension (MT) at 230° C. satisfying the following formula (1):

$$\text{Log(MT)} > -1.33 \text{ Log(MFR)} + 1.2 \tag{1}$$

(3) The extruded polypropylene type resin foam according to the above (1) or (2), wherein the polypropylene type resin composition contains at least 50 mass % of the linear polypropylene type resin.
(4) The extruded polypropylene type resin foam according to any one of the above (1) to (3), which has a thermal conductivity of from 20 to 34 mW/mK as measured in accordance with JIS-A1412.
(5) A process for producing an extruded polypropylene type resin foam, which employs a foaming apparatus having an extruder and a die attached to the forward end of the extruder, and which comprises melt-extruding a mixture of a polypropylene type resin composition containing a linear polypropylene type resin having a melt tension at 230° C. of from 3 to 30 g and a hydrocarbon type gas blowing agent under a temperature condition of from 160 to 250° C., to discharge the mixture into atmospheric air under a die-opening-vicinity resin pressure of from 2 to 10 MPa thereby to carry out extrusion-foaming.
(6) The process for producing an extruded polypropylene type resin foam according to the above (5), wherein the hydrocarbon type gas is at least one type selected from the group consisting of propane, n-butane, i-butane, n-pentane, i-pentane, cyclopentane and hexane.
(7) The process for producing an extruded polypropylene type resin foam according to the above (5) or (6), wherein the hydrocarbon type gas is injected as a blowing agent in an amount of from 1 to 30 parts by mass to 100 parts by mass of the polypropylene type resin composition.
(8) The process for producing an extruded polypropylene type resin foam according to any one of the above (5) to (7), wherein the extrusion rate per a unit area of an opening of the die is from 0.05 to 0.3 kg/h/mm$^2$.
(9) The process for producing an extruded polypropylene type resin foam according to any one of the above (5) to (8), wherein the extruder is a tandem type extruder and the extrusion rate by the extruder is from 1 to 1,000 kg/h.
(10) The process for producing an extruded polypropylene type resin foam according to any one of the above (5) to (9), wherein the die is a T-type die.

Effects of the Invention

The present invention provides an extruded polypropylene type resin foam having a high expansion ratio of at least 15 times, particularly at least 20 times, a closed cell ratio of at least 70%, particularly at least 90%, and an excellent thermal insulation property, and a process for producing such a foam.

In the present invention, it is not clear why the above method is obtained by using a linear polypropylene type resin having a specific melt tension and a blowing agent containing a hydrocarbon type gas. The reason is assumed to be as follows.

Namely, by using a linear polypropylene type resin having a specific melt tension, it is possible to develop a fluidity and an extension viscosity property of the resin suitable for foaming, and as a result, a foam having a high expansion ratio is obtained. Further, if a carbon oxide gas is used as a blowing agent like conventional processes, when the pressure is lowered to atmospheric pressure, the carbon oxide gas dissolved in the resin under a high pressure dissipates out from the resin rapidly, whereby a sufficient cooling effect of the resin is not obtained and the foam shrinks. Further, cell films tend to be destroyed to form a continuous cell. On the other hand, in the present invention, by using a hydrocarbon type gas, since the gas removes a vaporization latent heat from a polypropylene type resin composition at a time of blowing, a foam having a high expansion ratio can be obtained. Further, by conducting the blowing at a low pressure-lowering speed by the hydrocarbon gas, it is possible to suppress the destruction of cell films and to obtain a foam having a high closed cell ratio that has not been obtained before.

BEST MODE FOR CARRYING OUT THE INVENTION

Figure 1:
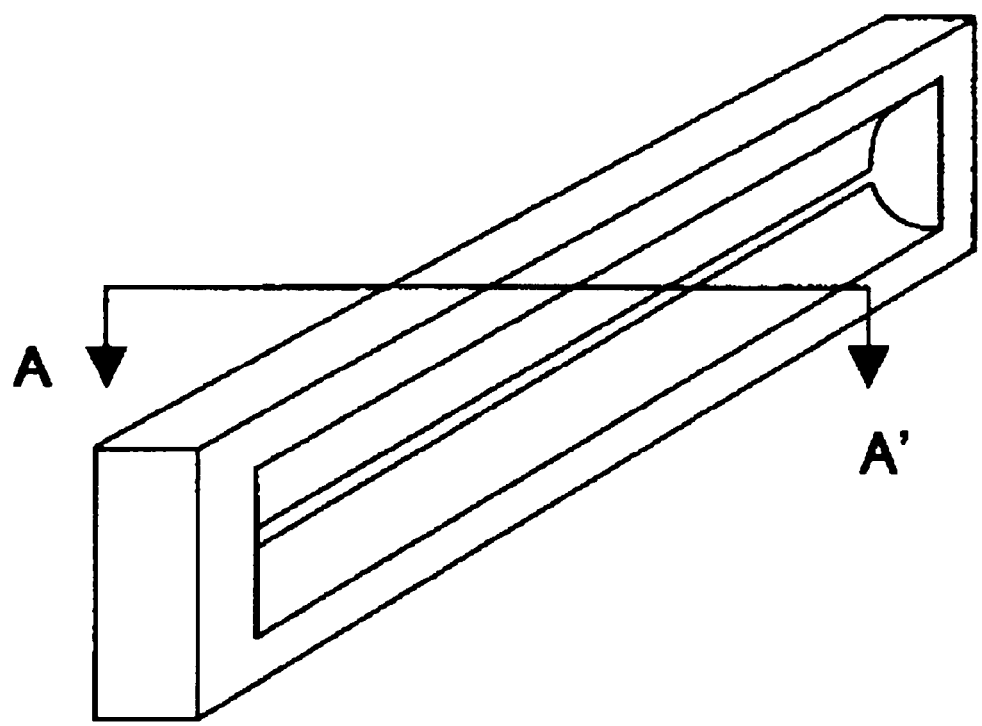
FIG. 1 is an external view of a die plate mold used in Example 1.

The polypropylene type resin composition of the present invention contains a polypropylene type resin (hereinafter referred to as polypropylene type resin A) having a specific property. The polypropylene type resin A has to have a melt tension at 230° C. of from 5 to 30 g, preferably from 6.5 to 20 g, more preferably from 7.5 to 10 g. If the melt tension value is less than 5 g, cells tend to be broken at a time of blowing, such being not preferred. On the contrary, if the melt tension value exceeds 30 g, cells do not grow at the time of blowing, such being not preferred.

Further, the polypropylene type resin A has a melt flow rate (MFR) at 230° C. of preferably from 5 to 30, particularly preferably from 5 to 20. Further, in the present invention, the relation between the melt flow rate and the melt tension (MT) at 230° C. preferably satisfies the following formula (1). Here, the MFR is obtained by a method pursuant to ASTM-D1238.

$$\text{Log}(MT) > -1.33 \text{ Log}(MFR) + 1.2 \tag{1}$$

If the polypropylene type resin A does not satisfy the above formula (1) in terms of the relation between the above melt tension and MFR, increase of the melt tension causes too low melt fluidity of the resin to cause such a problem that the resin pressure becomes extremely high at a time of extrusion, or a sufficient extension of cell films is not obtained at a time of blowing and it is difficult to obtain a foam of high expansion ratio, such being not preferred. In the formula (1), the left side value is larger than the right side value by preferably from 0.5 to 3, particularly preferably from 0.5 to 2.

In the present invention, the polypropylene type resin A has to be a linear polymer. The linear means that each of molecule chains of the propylene type polymer constituting the polypropylene type resin, is a polymerized product constituted by a propylene monomer being a constituent unit of the propylene type polymer and an α-olefin monomer polymerizable with the propylene monomer that are alternately polymerized into substantially a single chain. Since the linear polymer does not have a crosslinking structure using e.g. a chemical crosslinking or an electron beam crosslinking or a graft structure of e.g. a long chain branching, production or quality control of the linear polymer is relatively easy and the molecular structure is not easily deteriorated by repeated heat cycles applied in e.g. a re-pelleting step at a time of recycling. For these reasons, the linear polymer is suitably employed.

Into the polypropylene type resin composition of the present invention, a polypropylene type resin (hereinafter referred to as polypropylene type resin B) other than the polypropylene type resin A, may be blended. The polypropylene type resin B may, for example, be a homopolymer of propylene; a copolymer of propylene and an α-olefin other than propylene, that is copolymerizable with propylene, wherein the copolymer contains propylene as the main component; or a mixture of a polypropylene type resin and a polyolefin type resin such as a polyethylene type resin other than the polypropylene resin. Each of these polyolefin type resins may be used alone or at least two types may be used in combination.

The polypropylene type resin B is, among these, preferably a homopolymer of propylene having a relatively large molecular weight since it is excellent in the extrusion foaming property or performances of an obtained foam; a copolymer of propylene and ethylene, containing propylene as the main component; or a mixed resin of a polypropylene type resin and a polyethylene type resin.

The α-olefin other than ethylene, that is copolymerizable with ethylene, is not particularly limited. It may, for example, be propylene, 1-butene, 1-pentene, 1-hexene, 4-methyl-1-pentene, 1-heptene or 1-octene. Each of these α-olefins other than ethylene may be used alone or at least two types may be used in combination. Further, the α-olefin other than propylene, that is copolymerizable with polypropylene, is not particularly limited. It may, for example, be ethylene, 1-butene, 1-pentene, 1-hexene, 4-methyl-1-pentene, 1-heptene or 1-octene. Each of these α-olefins other than propylene may be used alone or at least two types may be used in combination.

When the polypropylene type resin composition of the present invention contains a polypropylene type resin B, the amount of the contained polypropylene type resin B is preferably at most 200 parts by mass, more preferably at most 100 parts by mass, particularly preferably from 40 to 80 parts by mass to 100 parts by mass of the polypropylene type resin A. When the content of the polypropylene type resin B exceeds 100 parts by mass, the polypropylene type resin B significantly influences on the blowing property, and the blowing may be prevented in some cases, such being not preferred.

Further, when the mixed resin of a polypropylene type resin and a polyethylene type resin is employed as the polypropylene type resin B, the mixed resin is not particularly limited, but the content of the polypropylene type resin in the mixed resin is preferably from 40 to 100 wt %, more preferably from 60 to 100 wt %. If the content of the polypropylene type resin in the mixed resin is less than 40 wt %, the mechanical strength or the heat resistance of a foam obtained may become insufficient.

The foam of the present invention is produced by blowing using a blowing agent containing at least a hydrocarbon type gas. The amount of the hydrocarbon type gas is preferably from 1 to 30 parts by mass, more preferably from 5 to 15 parts by mass, particularly preferably from 7 to 10 parts by mass to 100 parts by mass of the polyolefin type resin composition containing at least 30 wt % of the polypropylene resin A. If the amount of the blowing agent employed is less than 1 parts by mass, the extension ratio tends to decrease and other cells tend to grow. On the contrary, if the amount of the blowing agent exceeds 30 parts by mass, bubbles of excessive blowing gas contained in the composition merge to form a large void in the foam, such being not preferred.

The hydrocarbon type gas being the blowing agent of the present invention, is not particularly limited, but it is preferably at least one type selected from the group consisting of aliphatic hydrocarbon gases containing preferably from 3 to 6 carbon atoms, such as propane, n-butane, iso-butane, n-pentane, iso-pentane and hexane.

Among these, the hydrocarbon type gas is preferably iso-butane or a mixture of iso-butane/n-butane wherein the ratio (mol % ratio) of n-butane/iso-butane is preferably from 2.5 to 4, particularly preferably from 2.8 to 3.5, for the environmental reason that such a gas is a completely non-halogenated hydrocarbon gas having a high compatibility with polyolefin type resins.

Here, the blowing agent of the present invention may be used appropriately in combination with a blowing agent other than a hydrocarbon type gas. Such a blowing agent other than a hydrocarbon type gas may, for example, be a halogenated hydrocarbon type gas such as 1,2-dichlorotetrafluoroethane, 1-chlorotetrafluoroethane, 1,1-difluoroethane or 1,1,1,2-tetrafluoroethane; or a halogenated hydrocarbon compound containing as the main component a flon substitute gas such as HFC152a, HCFC142b or HFC134a.

The polypropylene type resin composition employed in the present invention contains the polypropylene type resin A as an essential component, and contains the polypropylene type resin B as the case requires. However, besides these components, one type or at least two types of the following various types of additives may be added to the composition as the case requires within a range not departing from the object of the present invention. An antioxidant (anti-aging agent) of phenol type, phosphorus type, amine type or sulfur type; a thermal stabilizer; a photostabilizer; a UV absorber; a fire retardant of phosphor type, nitrogen type, halogen type, antimoine type and so on; a lubricant; a metal damage proofing agent; an antistatic agent; a filler; a colorant; a cell-nucleating agent; a crystal nucleus agent, etc.

The cell-nucleating agent is not particularly limited, and it may, for example, be a talc, calcium carbonate, a clay, a kaolin, a mica, magnesium oxide, zinc oxide, a carbon black, a glass, quartz, a silica, an alumina, novaculite, an alumina hydrate, iron, iron oxide, silicon dioxide, titanium oxide, etc.

The crystal nucleus agent is not particularly limited. It may, usually, be a rosin type crystal nucleus agent, a sorbitol type crystal nucleus agent or a phosphate ester type crystal nucleus agent. The rosin type crystal nucleus agent may be any agent so long as it is a rosin type resin, and is not particularly limited. It may, for example, be dibenzylidene sorbitol (DBS) manufactured by New Japan Chemical Co., Ltd. The phosphate ester type crystal nucleus agent is not particularly limited. It may, for example, be NA-11 manufactured by ADEKA CORPORATION. These crystal nucleus agents may be used alone or a plurality of them may be used in combination.

The foam of the present invention is produced by using an extruder having a forward end to which a die is attached and having a blowing mechanism. A polypropylene type resin composition containing a polypropylene type resin A is blended with a blowing agent containing at least a hydrocarbon type gas to produce a mixture, and the mixture is discharged into the atmospheric air under a melt-extrusion temperature of from 160 to 250° C. and a resin pressure in the vicinity of die opening (pressure loss) of from 2 to 10 MPa, to conduct an extrusion foaming.

Here, the vicinity of die opening means a portion just before the resin enters into a die opening. Specifically, it means, for example, a resin passage from the forward end of the extruder to be connected with the die to the die opening.

If the melt extrusion temperature is less than 160° C., dissolution and diffusion of the hydrocarbon type gas into the resin becomes insufficient. If the temperature exceeds 250° C., deterioration of the polypropylene type resin such as breakage of molecular chain starts, such being not preferred. The melt extrusion temperature is, among these, preferably from 170 to 240° C.

Further, in the present invention, the pressure loss in the die vicinity portion in the extruder is from 2 to 10 MPa. If the pressure loss is less than 2 MPa, the hydrocarbon type gas dissolved in the polypropylene type resin composition tends to be vaporized in the extruder or in the die, to cause blowing in the apparatus, to further cause merging of cells, excessive growth of cells, decrease of expansion ratio and significant deterioration of external appearance, such being not preferred. If the pressure loss exceeds 10 MPa, a large shearing force tends to be applied to cells at the time of forming the cells by blowing, which tends to cause breakage of cells and unevenness of cell structure, such being not preferred. Such an imperfectness of the cell structure is a big barrier to obtainment of sufficient thermal properties of the foam. The pressure loss is preferably from 3 to 9 MPa, more preferably from 4 to 8 MPa.

The die in the extruder employed in the present invention, is preferably a flat die (hereinafter referred to as T-type die) having a flat-plate shape with a large width, or a multistrand die having a plurality of opening holes. When the T-type die is employed, it is possible to extrude the resin into a flat sheet or board, and when the multistrand die is employed, it is possible to extrude many thin strand foams from a plurality of holes and bind them to obtain a foam.

When the multistrand die is employed, in order to optimize the external appearance of a foam produced by blowing and easiness of shape adjustment and in order to reduce the closed cell size of the foam, the opening (hole) diameter of the die is from 0.4 to 2.0 mm, preferably from 0.1 to 1.2 mm. If the diameter is less than 0.4 mm, the strand diameter in the construction of the foam becomes too small, and the foam tends to be torn at the time of retrieving, such being not preferred. If the opening diameter exceeds 2.0 mm, the strand diameter becomes too large to conduct a post-extrusion shaping of the foam into a board shape to obtain smoothness. The depth of the die is preferably from 0.1 to 10 mm, and a plurality of openings are preferably provided on the front plane of the die.

In order to obtain a foam having a high closed cell ratio and a high thermal performance, it is preferred to employ the T-type die among the above dies.

Further, the extrusion rate V per a unit area of an opening of the die is preferably from 0.05 to 0.3 kg/h/mm$^2$, more preferably from 0.05 to 0.2 kg/h/mm$^2$. Here, the 'h' in the unit means an hour from now on.

In the case of multistrand die, it is preferred to use a multi-hole type die having 50 to 5,000 openings (holes), preferably from 100 to 3,000 openings, and the extrusion rate V per each opening (hole) of the die is preferably from 0.1 to 0.3 kg/h/mm$^2$.

When the T-type die is employed, the extrusion rate V per each opening (area) of the die is preferably from 0.05 to 0.2 kg/h/mm$^2$. Here, the extrusion rate V (kg/h/mm$^2$) per each hole opening of the die is obtained by the following formula.

Extrusion rate $V$ per a unit area of an opening of die=total extrusion rate(kg/h)of extruder/die opening area(mm$^2$)

Adjustment of the extrusion rate V per each opening of the die into the above range, is achieved by e.g. increasing the screw rotation speed of the extruder; increasing the screw thread pitch of the screw of the extruder; or increasing the depth of grooves of the screw of the extruder.

If the extrusion rate V (kg/h/mm$^2$) per each opening of the die is less than 0.05, not only the productivity becomes poor, but also the flow distribution of a gellated fluid material in the die becomes uneven, and it becomes difficult to control the pressure loss in the die portion to a suitable pressure for blowing, whereby it becomes difficult to obtain a foam having a sufficient expansion ratio. On the other hand, if the extrusion rate V (kg/h/mm$^2$) exceeds 0.3, breakage of cells tends to occur, to prevent sufficient heat-insulation performance and to deteriorate the external appearance of the foam, such being not preferred.

The total extrusion rate is, although depending on the extruder, preferably from 1 to 1,000 kg/h. It is preferably from 100 to 1,000 kg/h in a practical production type machine having a relatively large screw diameter. On the other hand, the total extrusion rate is generally preferably from 15 kg/h to 50 kg/h in a type of machine having a relatively small screw diameter. Among these, the total extrusion rate of the foam is more preferably from 20 to 130 kg/h in a small-capacity type machine, and it is more preferably from 100 to 1,000 kg/h in a large capacity type machine.

In the extrusion foaming molding machine, the screw diameter (D) is preferably from 40 to 160 (mm), and provided that the screw length is L, L/D is preferably from 15 to 55. The extrusion foaming molding machine is preferably a tandem type extruder having a basic construction employing two screws combined in series. By using such a tandem type extruder, it is possible to control the pressure loss condition of the die portion and the extrusion rate independently to make them suitable for blowing, by controlling the rotation speeds of respective screws. Accordingly, such an extruder is suitable for production of a foam. Further, by using a serial tandem extruder having two screws, it is possible to finely adjust the temperature of a mixed product of a gelled molten resin and a gas, such being preferred. Here, based on the L/D of a first stage screw, the L/D of a second stage screw is preferably from 1.0 to 1.5 times as large.

The shape of the die to be employed in the present invention, is not limited. But the number of openings, the shape and the thickness are preferably constructed so that the pressure loss per each opening becomes from 2 to 10 MPa. By selecting the die so as to satisfy these conditions, it is possible to satisfactorily obtain a foam having a sufficient thermal performance.

Further, as a specific example of the process for producing a foam of the present invention, the polypropylene type resin composition is processed by employing an extrusion molding machine provided with a line for supplying a blowing gas of a constant flow rate from a gas supplying apparatus through a cylinder barrel measurement portion, in the following process. Namely, the polypropylene type resin composition is heated to a predetermined temperature to be melted by a first stage extruder, the molten composition is kneaded together with a predetermined amount of a blowing gas, and while the resin composition is further kneaded by a second stage extruder, its temperature is adjusted to be a resin temperature suitable for blowing. Subsequently, the resin composition is extrusion-molded through a die and a die plate, and exposed to an environment of atmospheric pressure at a blast, whereby the resin composition is molded into a foam having a sheet shape or a board shape.

Further, as the case requires, in order to adjust the shape of the foam, the shape or the size may be adjusted by using e.g. a cutter or a sandwiching conveyer. Further, as the case requires, e.g. an aluminum sheet, non-woven cloth or a sheet shaped member such as a leather may be laminated on one or both surfaces of the foam to impart various performances such as a mechanical strength, a thermal resistance or a fire retardant.

In the extruded polypropylene type resin foam of the present invention, it is possible to achieve an expansion ratio of at least 15 times by the above production process, and the expansion ratio is preferably from 20 to 60 times. If the expansion ratio is less than 15 times, the weight and the material cost become too high to develop a sufficient thermal performance of the member, such being not preferred.

The extruded polypropylene type resin foam obtainable by the present invention has a closed cell ratio of at least 70%, preferably at least 80%, the most preferably at least 90%. If the closed cell ratio is less than 70%, a high thermal insulation performance cannot be obtained.

For the reasons above, the extruded polypropylene type resin foam of the present invention has an average cell size of preferably from 100 to 500 µm, particularly preferably from 100 to 300 µm, and a thermal conductivity of preferably from 20 to 34 mW/mK, particularly preferably from 20 to 28 mW/mK.

The extruded polypropylene type resin foam of the present invention has an optional shape such as a sheet shape, a rod shape, a tube shape or a block shape since the foam has substantially no crosslinking structure. When the extruded foam has a sheet shape for example, the extruded foam may be secondarily molded by vacuum forming, pressurized air forming, matched die, etc. to produce a secondary molded product such as a tray or a container.

EXAMPLES

In order to describe the present invention in more detail, explanations and comparative explanations will be described. However, it is a matter of course that the present invention should not be construed as limited to these Examples.

Here, measurement and calculation methods of various physical property values in Examples and Comparative Example are as follows.

Foam density: A foam sample was cut into about 2 cm$^2$, its mass was measured, the cut sample was immerged in a known amount of water in a graduated cylinder by using an extremely fine wire to measure the real volume of the sample from the change of water level. The foam density was calculated by the following formula:

Foam density=mass/volume

Expansion ratio: Calculated by a formula:

Expansion ratio=0.9/foam specific gravity.

Average cell size: The foam sample was cut to have a cross-section, the number of cells in 1 mm length was measured at each of 10 different 1 mm lines in the cross-section, and the average cell size was calculated by the following formula:

Average cell size=(10,000/total cell number)

Thermal conductivity: In accordance with JIS A-1412, a foam obtained was cut into plate-shaped test pieces of 20 cm×20 cm×20 cm, and the thermal conductivity was measured by a thermal conductivity measurement apparatus HCO-074 (manufactured by Eko Instruments Co., Ltd.).

Closed cell ratio: Measured in accordance with ASTM-D2856.

Light weight property: Evaluated by three levels that are ○ (good), Δ (fair) and X (not good).

Thermal insulation property: Evaluated by three levels that are ○ (good), Δ (fair) and X (not good).

Product external appearance (surface smoothness): Evaluated by three levels that are ○ (good), Δ (fair) and X (not good).

Product external appearance (presence or absence of voids): Evaluated by three levels that are ○ (good), Δ (fair) and X (not good).

Example 1

Figure 2:
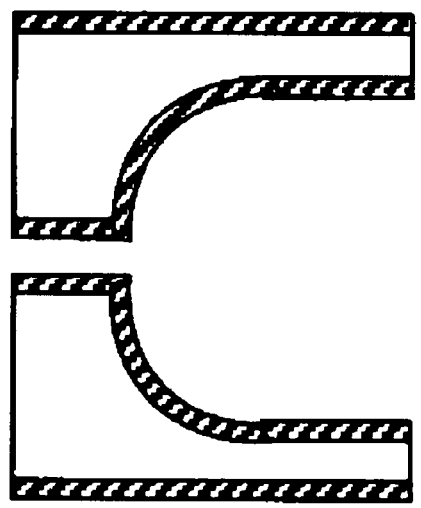
FIG. 2 is a cross-sectional view along A-A' of the die plate mold of FIG. 1.

A tandem type extrusion foaming molding machine was employed, which has an extruder having a coat-hanger-die-shaped forward end having an opening width of 1,000 mm and an opening thickness of 5 mm, wherein the forward end is provided with a T-type die plate mold (FIG. 1 shows the external view, FIG. 2 shows a cross-sectional view along A-A' line) having an opening width of 300 mm and an opening thickness of 2 mm, wherein the opening expands with φ 10 mm R.

Further, as a polypropylene type resin A, a homopolypropylene resin having a melt tension (MT) at 230° C. of 7.6 g and a melt flow rate (MFR) of 3.3 g/10 min was employed. To 100 wt % of the polypropylene resin, 2,000 ppm of Irganox 1010FF (manufactured by Ciba Specialty Chemicals) as a thermal degradation-preventing agent, 2,000 ppm of Irgafos 1 (manufactured by Ciba Specialty Chemicals), 200 ppm of calcium stearate (manufactured by NOF Corporation) as a lubricant and 2.5 wt % of dry type mica S-200HG (manufactured by Repco Inc.) as a cell-nucleating agent, were added to prepare a polypropylene type resin A composition.

The polypropylene type resin A composition was extruded and melted by the above tandem type extrusion foaming molding machine wherein the rotational speed of the screw was adjusted so that the extrusion rate became 40 kg/h, at 230° C. Thereafter, a mixed gas of n-butane and iso-butane (n-butane/iso-butane=74 mol %/24 mol %) was injected into the molten resin at a constant rate of 3.0 kg/h, and the molten resin was kneaded. Subsequently, in the extrusion foaming molding machine, the temperature was adjusted so that the mixture of the molten resin and the blowing gas became 180° C., and the mixture was extruded under the die mold temperature of 180° C., whereby the pressure applied to the resin was quickly lowered to atmospheric pressure and the dissolved gas was dissipated from the resin, to thereby achieve an extrusion foaming molding. The resin pressure in the die of the foaming molding machine was 3.0 MPa. Table 1 shows various properties of a foam obtained. The foam was a light weight foam sheet having no void and excellent in the surface smoothness.

Example 2

Extrusion-foaming was carried out by the tandem type extrusion foaming molding machine in the same manner as Example 1 except that a mixed gas of n-butane and iso-butane being a blowing gas was injected at a constant rate of 0.6 kg/h into the molten resin, the mixture of the molten resin and the blowing gas was extrusion-kneaded and the temperature was adjusted so that the temperature of the mixture became 185° C. and the die mold temperature was set to be 185° C.

The resin pressure in the die of the foaming molding machine was 5.9 MPa. Table 1 shows various properties of a foam obtained. The foam was a light-weight foam sheet having no void and excellent in the surface smoothness.

Example 3

Extrusion-foaming was carried out by a tandem type extrusion foaming molding machine in the same manner as Example 1 except that the polypropylene type resin A composition was extruded at an extrusion rate of 100 kg/h, and the mixed gas of n-butane and iso-butane being a blowing gas was injected at a constant rate of 10 kg/h.

The resin pressure in the die of the foaming molding machine at this time was 5.9 MPa. Table 1 shows various properties of a foam obtained. The foam was a light-weight foam sheet having no void and excellent in the surface smoothness.

Example 4

Figure 3:
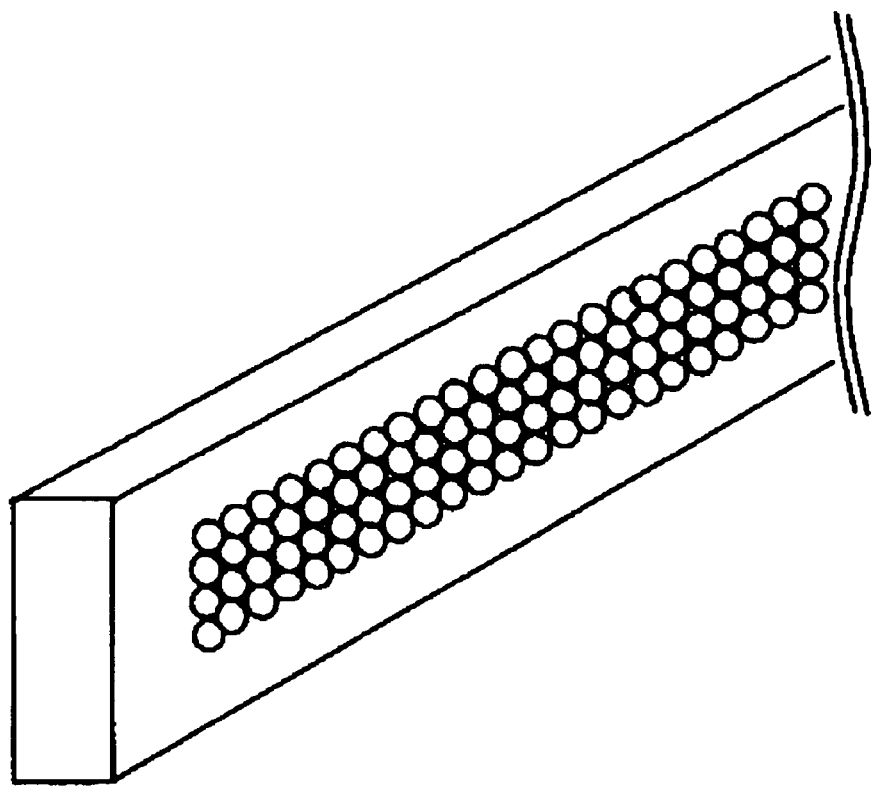
FIG. 3 is an external view of a multi-hole die plate mold used in Example 4.

Extrusion-foaming was carried out in the same manner as Example 1 except that an extrusion foaming molding machine was employed, which was provided with a T-type die plate mold having an opening width of 1,000 mm and an opening thickness of 2 mm, wherein the opening expands with φ 20 mmR, and wherein the T-type die plate has a forward end further provided with a multi-hole die plate mold shown in FIG. 3 having 772 extrusion holes in total arranged in four extrusion holes in vertical and 193 extrusion holes in horizontal, each having a hole diameter of 0.60 mm.

The resin pressure in the die of the blowing molding machine at this time was 5.0 MPa. Table 1 shows various properties of a foam obtained. The foam was a light-weight foam sheet similar to the one in Example 1, but it had a regular waving due to the multi-hole die in terms of the surface smoothness.

Comparative Example 1

Extrusion foaming was carried out by the extrusion foaming molding machine in the same manner as Example 1 except that a homopropylene type B composition was employed, which contained a homopolypropylene resin having a melt tension (MT) at 230° C. of 2.7 g and a melt flow rate (MFR) of 2.3 g/10 min, and containing various types of additives blended in the same content amount as those of Example 1, and a mixed gas of n-butane and iso-butane being a blowing gas was injected into the molten resin at a constant rate of 1.1 kg/h, and that the extrusion foaming was carried out at a resin temperature of 172° C.

The resin pressure in the die in the foaming molding machine at this time was 2.3 MPa. Table 1 shows various properties of a foam obtained. The foam was a foamed sheet having a good external appearance, but it had a low expansion ratio and was not satisfactory in the light-weight property.

Comparative Example 2

Extrusion foaming was carried out by the extrusion foaming molding machine in the same manner as Example 1 except that the polypropylene type resin A composition was extruded at an extrusion rate of 10 kg/h, the mixed gas of n-butane and iso-butane being a blowing gas was injected into the molten resin at a constant rate of 0.8 kg/h, and the blowing was carried out at a resin temperature of 185° C.

The resin pressure in the die in the extrusion foaming molding machine was 4.5 MPa. Table 1 shows various properties of a foam obtained. The foam had a good external appearance but it had a low expansion rate and was not satisfactory in the light weight property.

Comparative Example 3

Extrusion foaming was carried out by the extrusion foaming molding machine in the same manner as Example 1 except that the polypropylene type resin A composition was extruded at an extrusion rate of 130 kg/h, the mixed gas of n-butane and iso-butane being a blowing gas was injected into the molten resin at a constant rate of 10 kg/h, and the blowing was carried out at a resin temperature of 185° C.

The resin pressure in the die in the extrusion foaming molding machine at this time was 10.3 MPa. Table 1 shows various properties of a foam obtained. The foam was a foam sheet of light-weight, but it had a low expansion ratio and was insufficient in the thermal insulation property.

Comparative Example 4

Extrusion foaming was carried out by the extrusion foaming molding machine in the same manner as Example 1 except that carbon dioxide being a blowing gas was injected into the molten polypropylene type resin A composition at a constant rate of 3.0 kg/h, and blowing was carried out at a resin temperature of 170° C.

The resin pressure in the die in the extrusion foaming molding machine at this time was 7.4 MPa. Table 1 shows various properties of a foam obtained. The foam was a foam sheet containing voids and not satisfactory in the surface smoothness, and it was not satisfactory also in the light-weight property.

Comparative Example 5

Extrusion foaming was carried out by the extrusion foaming molding machine in the same manner as Example 4 except that carbon dioxide being a blowing gas was injected into the molten polypropylene type resin A composition at a constant rate of 3.0 kg/h, and blowing was carried out at a resin temperature of 185° C.

The resin pressure in the die in the extrusion foaming molding machine at this time was 9.3 MPa. Table 1 shows various properties of a foam obtained. The foam had a low closed cell ratio, and was insufficient in the heat insulation property. Further, although the foam was light in weight, it contained voids and it had regular waves due to the multi-hole die in terms of the surface smoothness.

INDUSTRIAL APPLICABILITY

The extruded polypropylene type resin foam of the present invention is excellent in the performances such as the low density, the heat insulation property, the thermal resistance and the rigidity, with a reasonable cost, and is excellent in the recycle performance. Accordingly, the extruded polypropylene type resin foam of the present invention is widely usable mainly in automobile material use, common consumable use such as for stationary, packaging and buffer material use.

The entire disclosure of Japanese Patent Application No. 2007-239779 filed on Sep. 14, 2007 including specification, claims, drawings and summary is incorporated herein by reference in its entirety.

The invention claimed is:

1. An extruded polypropylene resin foam, which is produced by extrusion-foaming a polypropylene resin composition comprising a linear polypropylene resin having a melt tension at 230° C. of from 5 to 30 g, with a blowing agent comprising at least a hydrocarbon gas, and which has an expansion ratio of at least 15 times and a closed cell ratio of at least 70%.

2. The extruded polypropylene resin foam according to claim 1, wherein the linear polypropylene resin has a melt flow rate (MFR) at 230° C. and a melt tension (MT) at 230° C. satisfying the following formula (1):

$$\mathrm{Log}(MT) > -1.33\,\mathrm{Log}(MFR) + 1.2 \qquad (1).$$

3. The extruded polypropylene resin foam according to claim 2, wherein the value of Log (MT) is larger than the value −1.33 Log (MFR)+1.2 by an amount of from 0.5 to 2.

4. The extruded polypropylene resin foam according to claim 1, wherein the polypropylene resin composition contains at least 50 mass % of the linear polypropylene resin.

5. The extruded polypropylene resin foam according to claim 1, which has a thermal conductivity of from 20 to 34 mW/mK as measured in accordance with JIS-A1412.

TABLE 1

|  |  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- | --- | --- |
| Die |  | T die | T die | T die | Muti-hole die | T die | T die | T die | T die | Muti-hole die |
| Die opening area | mm$^2$ | 600 | 600 | 600 | 218 | 600 | 600 | 600 | 600 | 218 |
| Resin: melt tension MT | g (230° C.) | 7.6 | 7.6 | 7.6 | 7.6 | 2.7 | 7.6 | 7.6 | 7.6 | 7.6 |
| Resin: melt flow rate MFR | g/10 min (230° C.) | 3.3 | 3.3 | 3.3 | 3.3 | 2.3 | 3.3 | 3.3 | 3.3 | 3.3 |
| Log (MT) + 1.33 Log (MFR) |  | 1.6 | 1.6 | 1.6 | 1.6 | 0.9 | 1.6 | 1.6 | 1.6 | 1.6 |
| Extrusion rate | kg/h | 40 | 40 | 100 | 40 | 40 | 10 | 130 | 40 | 40 |
| Extrusion rate per unit area of an opening | kg/h/mm$^2$ | 0.067 | 0.067 | 0.17 | 0.18 | 0.067 | 0.017 | 0.22 | 0.067 | 0.18 |
| Blowing gas supply rate | kg/h | 3 | 0.6 | 10 | 3 | 1.1 | 0.8 | 10 | 3 | 3 |
| Blowing gas amount based on 100 parts by mass of resin | parts by mass | 8.1 | 1.5 | 11 | 8.1 | 2.9 | 8.1 | 8.3 | 8.1 | 8.1 |
| Resin temperature | ° C. | 180 | 185 | 180 | 180 | 172 | 185 | 185 | 170 | 185 |
| Blowing pressure | MPa | 3.0 | 5.9 | 5.0 | 5.0 | 2.3 | 4.5 | 10.3 | 7.4 | 9.3 |
| Product density | kg/m$^3$ | 29 | 36 | 29 | 22 | 114 | 70 | 25 | 76 | 30 |
| Expansion ratio | Times | 31 | 25 | 31 | 41 | 8 | 13 | 36 | 12 | 30 |
| Average cell size | μm | 305 | 452 | 233 | 218 | 131 | 327 | 259 | 228 | 154 |
| Thermal conductivity | W/mW | 0.030 | 0.034 | 0.028 | 0.033 | 0.055 | 0.040 | 0.036 | 0.042 | 0.037 |
| Closed cell ratio | % | 93 | 98 | 91 | 77 | 96 | 94 | 43 | 55 | 35 |
| Light-weight property | ○ΔX | ○ | ○ | ○ | ○ | X | X | ○ | Δ | ○ |
| Heat insulation property | ○ΔX | ○ | Δ | ○ | Δ | X | X | Δ | X | X |
| Product external appearance (smoothness) | ○ΔX | ○ | ○ | ○ | Δ | ○ | ○ | X | X | X |
| Product external appearance (void) | ○ΔX | ○ | ○ | ○ | ○ | ○ | ○ | ○ | Δ | Δ |

6. The extruded polypropylene resin foam according to claim 1, wherein the polypropylene resin composition comprises a linear polypropylene homopolymer and the hydrocarbon gas comprises at least one butane.

7. The extruded polypropylene resin foam according to claim 1, further comprising a lubricant and a cell-nucleating agent.

8. The extruded polypropylene resin foam according to claim 1, further comprising calcium stearate, mica, gaseous n-butane and gaseous iso-butane.

9. The extruded polypropylene resin foam according to claim 1, wherein the hydrocarbon gas is completely non-halogenated.

10. The extruded polypropylene resin foam according to claim 1, having an average cell size of from 218 to 452 μm.

11. The extruded polypropylene resin foam according to claim 1, having a closed cell ratio of from 77 to 98%.

12. The extruded polypropylene resin foam according to claim 1, having a density of from 22 to 36 kg/m$^3$.

13. A process for producing an extruded polypropylene resin foam, which employs a foaming apparatus having an extruder and a die attached to the forward end of the extruder, and which comprises
melt-extruding a mixture of a polypropylene resin composition comprising a linear polypropylene resin having a melt tension at 230° C. of from 3 to 30 g and a hydrocarbon gas blowing agent under a temperature condition of from 160 to 250° C., to discharge the mixture into atmospheric air under a die-opening-vicinity resin pressure of from 2 to 10 MPa thereby to carry out extrusion-foaming.

14. The process for producing an extruded polypropylene resin foam according to claim 13, wherein the hydrocarbon gas is at least one selected from the group consisting of propane, n-butane, i-butane, n-pentane, i-pentane, cyclopentane and hexane.

15. The process for producing an extruded polypropylene resin foam according to claim 13, wherein the hydrocarbon gas is injected as a blowing agent in an amount of from 1 to 30 parts by mass to 100 parts by mass of the polypropylene resin composition.

16. The process for producing an extruded polypropylene resin foam according to claim 13, wherein the extrusion rate per a unit area of an opening of the die is from 0.05 to 0.3 kg/h/mm$^2$.

17. The process for producing an extruded polypropylene resin foam according to claim 13, wherein the extruder is a tandem extruder, and the extrusion rate by the extruder is from 1 to 1,000 kg/h.

18. The process for producing an extruded polyproylene resin foam according to claim 13, wherein the die is a T-type die.

19. The process for producing an extruded polypropylene resin foam according to claim 13, wherein the hydrocarbon gas is completely non-halogenated.

20. The process for producing an extruded polypropylene resin foam according to claim 13, wherein the linear polypropylene resin comprises at least one polypropylene homopolymer and the hydrocarbon gas comprises a mixture of n-butane and iso-butane.

* * * * *